Oct. 20, 1953 L. L. HAZEN 2,655,828
AUTOMATIC TAKE-UP STEADY REST
Filed March 1, 1951 2 Sheets-Sheet 1
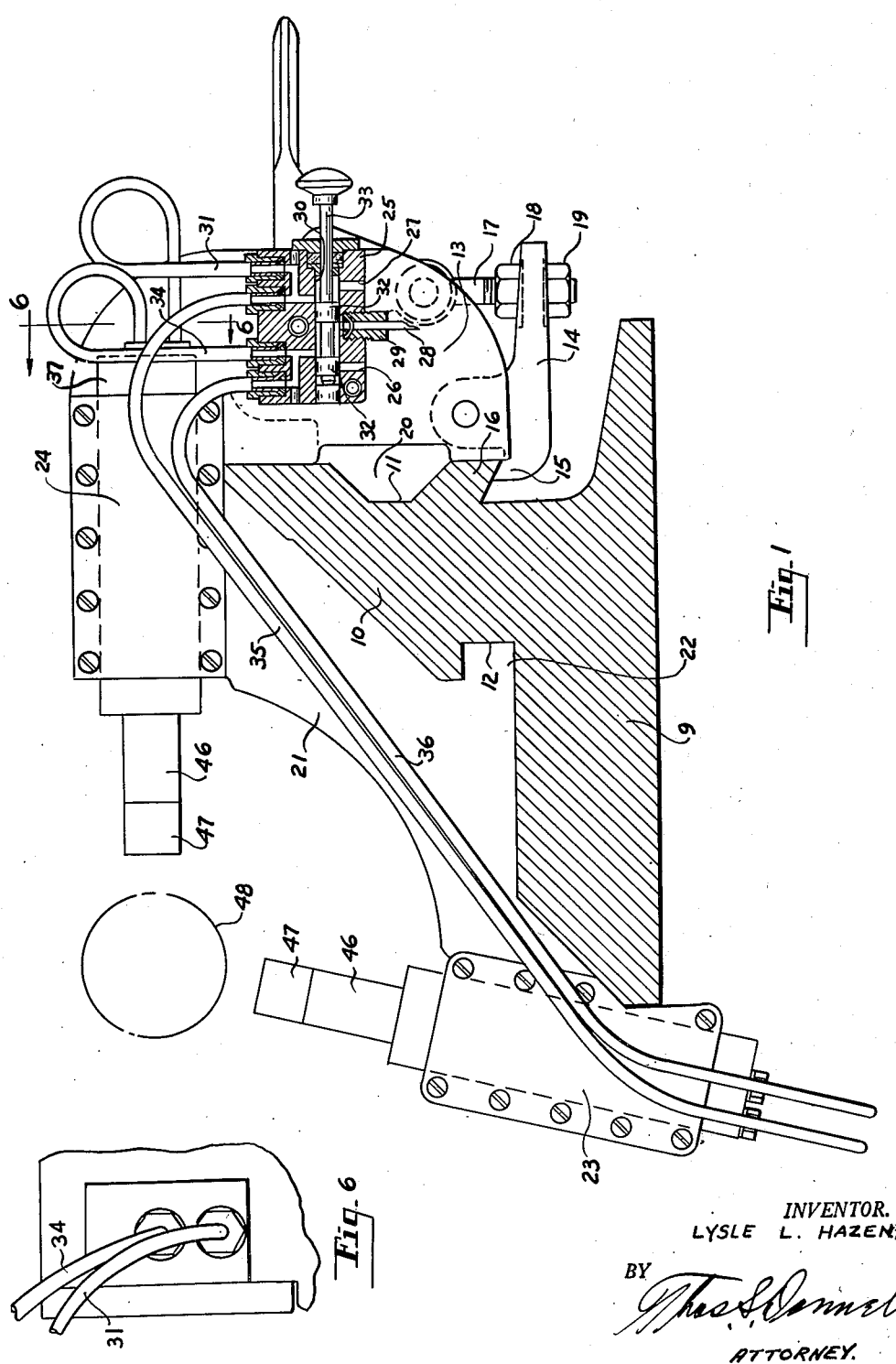
INVENTOR.
LYSLE L. HAZEN,
BY
ATTORNEY.

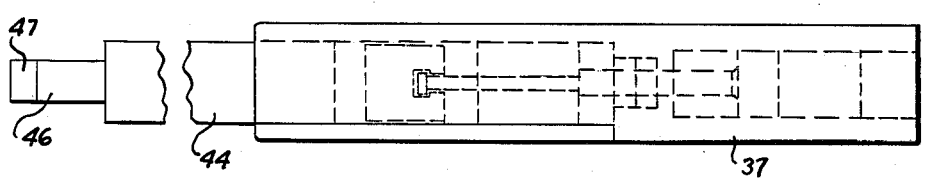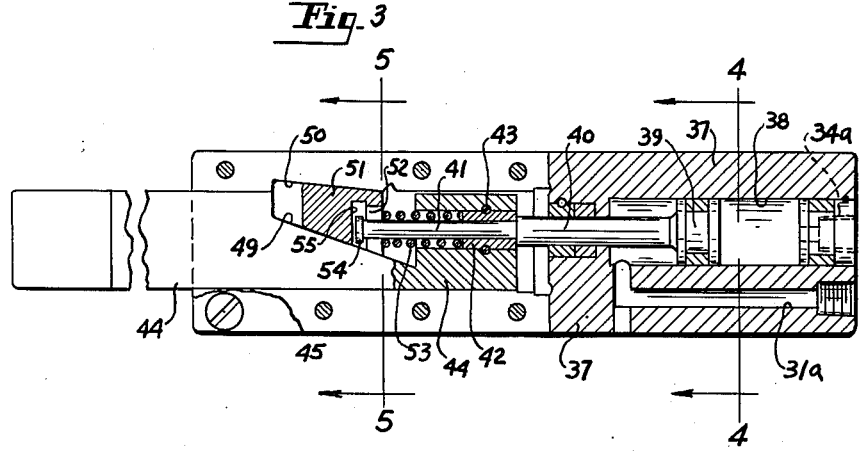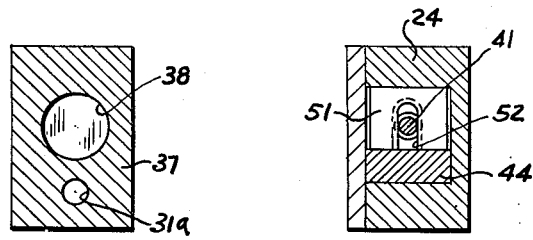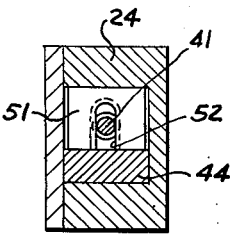
INVENTOR.
LYSLE L. HAZEN.

Patented Oct. 20, 1953

2,655,828

UNITED STATES PATENT OFFICE 2,655,828

AUTOMATIC TAKE-UP STEADY REST

Lysle L. Hazen, Detroit, Mich., assignor to Enterprise Machine Parts Corporation, Detroit, Mich., a corporation of Michigan Application March 1, 1951, Serial No. 213,420

2 Claims. (Cl. 82—38)

My invention relates to a new and useful improvement in an automatic take-up steady rest and it is adapted for use on that type of metal working machine in which a steady rest or follow rest is required, such as on grinding machines, latches, etc. The invention is particularly adapted for use on external grinding operations and other types of metal or woodworking machines where it is necessary for the steady rest to contact a diameter which is constantly changing during the grinding or working operations as for instance, the crank pin of a crank shaft. It is an object of the present invention to provide a steady rest of this type having the contacting jaws or fingers so arranged, constructed and operated that they are automatically maintained in contact with the work-piece regardless of the changing diameter of the work-piece.

Another object of the invention is the provision of a steady rest whereby the jaws may be quickly moved into engaging position with a work-piece of various sizes with a minimum amount of time consumed.

Another object of the invention is the provision of an automatic take-up steady rest so arranged and constructed that the work-piece engaging members may be easily and quickly moved into engaging position and prevented from moving rearwardly out of engaging position while at the same time, when desired, these work-piece engaging members may be quickly withdrawn to a position out of engagement with the work-piece.

Other objects will appear hereinafter.

It is recognized that various modifications and changes may be made in the detail of structure illustrated without departing from the invention and it is intended that the present disclosure be considered but the preferred embodiment.

Forming a part of this application are drawings in which,

Fig. 1 is a side elevational view of the invention showing it applied to a machine illustrated in cross section, Fig. 2 is an elevational view of one of the operating mechanisms used in the invention, Fig. 3 is a longitudinally vertical sectional view slightly enlarged of the structure shown in Fig. 2 with parts broken away and parts shown in elevation, Fig. 4 is a sectional view taken on line 4—4 of Fig. 3, Fig. 5 is a sectional view taken on line 5—5 of Fig. 3, Fig. 6 is a fragmentary elevational view taken on line 6—6 of Fig. 1.

In Fig. 1 I have shown the invention used with a machine having a base 9 projecting upwardly from which is the plate 10 and in which is formed the groove 11 on one side and a groove 12 at the opposite side.

The invention embodies a suitable support or bracket 13 swingably mounted on which is a keeper 14 having a nose 15 adapted to engage the under surface of the rib 16, the bracket 13 engaging the outer face of this rib 16. Swingably mounted on the bracket 13 is a stud 17 which is projected through the end of the keeper 14 and provided with lock nuts 18 and 19 whereby the nose 15 may be moved into and retained in clamping relation to the rib 16. A rib 20 is carried by the bracket 13 for slidably engaging in the groove 11. A downwardly projecting arm 21 is carried by this bracket and provided with the tongue 22 which engages in the groove 12. The construction is such that upon loosening the nuts 18 and 19 the bracket may be moved longitudinally of the member 12 and then clamped in fixed relation thereto. Mounted on the downwardly projecting arm 21 is a retainer 23 and a similar retainer 24 is mounted at the upper part. It is believed obvious that if desired additional retainers 23 or 24 may be carried by this bracket but for the present installation but a pair has been illustrated.

Mounted on the bracket 13 is a valve housing 25 having the exhaust openings 26 and 27 communicating with the bore 30. Secured to the housing 25 so as to communicate with the bore 30 by means of the fitting 29 is an inlet delivery pipe 28 which may serve to conduct a fluid under pressure into the bore 30. Slidable in the bore 30 is the valve embodying the stem 33 and the valve spools 32. Communicating with the bore 30 are pipes 31 and 35 at one side of the valve housing and communicating with the bore 30 are the pipes 34 and 36. Mounted in each of the retainers 23 and 24 is a similar structure and a description of one will suffice for both.

Mounted on this retainer 24 is a structure which may be termed a cylinder block 37 and in which is formed the bore or cylinder 38 in which is slidably mounted the piston 39 having a piston rod 40 projecting outwardly from the cylinder and provided with the reduced portion or stem 41 which extends through the bushing 42 keyed by the ring 43 to the block 44, which is slidable in the passage 45. This block 44 is provided with the finger or stem 46 carrying a contact shoe 47 at its end. From Fig. 3 it will appear, when it is considered that the structure 37 is mounted in fixed relation on the machine with which used, that this contact shoe may move toward and away from the member 37 and be moved outwardly to engage the periphery of the work-piece 48.

Formed in this block 44 is a recess having an inclined face 49 which extends angularly to the recessed face 50 formed in the upper side of the passage 45. Seated in this recess is a wedge block 51 having on its end face a slot 52 which communicates with a pocket 55. The stem 41 may be slipped into the slot 52 with the head 54 on the end of the stem 41 engaging in the pocket 55. Embracing this stem 41 is a spring 53, one end of which bears against the bushing 42 and the other bears against the wedge block 51, so that the spring functions to normally tend to force the wedge block 51 to slide upwardly on the inclined surface 49 and lock the member 44 in fixed position in the passage 45.

Leading into the cylinder 38 at one side of the piston 39 is a passage 31a which is in communication with the pipe 31. Leading into the cylinder 30a at the opposite side of the piston 39 is a passage 34a with which the pipe 34 is in communication.

When fluid, such as oil or air, is delivered under pressure through the pipe 28 this fluid under pressure may be delivered into the cylinder 38 at either side of the piston 39 selectively.

This control is effected by the valve. When the parts are moved to the position shown in Fig. 1 the fluid entering the cylinder 30 would pass through the pipe 34 and into the cylinder 38 through the passage 34a, the cylinder at the opposite side of the piston exhausting through the passage 31a and the pipe 31. The fluid entering through the pipe 34a would move the piston 39 to the left of the position shown in Fig. 3 and the shoulder on the stem 40 bearing against the bushing 42 would cause the block 44 to move to the left in the passage 45. It will be noted that there is a slight play of the head 54 in the pocket 55 and as this movement of the member 44 to the left begins the wedge block 51 would remain temporarily stationary so that the spring 53 would be slightly compressed. Thus the inclined face 49 would move slightly away from the bottom face of the wedge block 51 and the locking engagement would be relieved. In this way the contact shoe 47 may be moved outwardly to engage the work-piece. Upon engagement of the shoe 47 with the work-piece so that movement of the member 44 ceases, the wedge block 51 would automatically move into locking position with the face 49 in response to the pressure of the spring 43.

When it is desired to move the block 44 to the right of Fig. 3, or in the opposite direction, the valve would be operated to deliver the fluid under pressure through the pipe 31 and the passage 31a so that the piston 39 would move to the right. As this movement begins the head 54 would be brought into engagement with the block 51 at opposite sides of the slot 52 so as to move the wedge block 51 out of locked position whereupon the block 44 would also move to the right in response to the pressure of the spring against the bushing 42. When the desired position has been reached the thrust will be relieved and the spring 53 will again move the wedge block 51 into its locking position.

The stem 40 is merely a thrust delivery member serving to deliver a thrust to the end of the block 44 when moved in one direction. When moved in the opposite direction the member 40 through the reduced portion 41 in the head 54, serves to deliver a pull on the block 51.

It is believed obvious that other mechanisms may be used for sliding the block 44 as the stem 40 might be connected to some mechanical means for movement of the block 44. It is believed obvious that the adjustment to the various diameters of work-pieces may be easily and quickly made and that the block 51 will automatically move into locking position to retain the member 44 in its various adjusted positions and resist any backward thrust on the member 44. The surface 49 and the opposed face of the block 51 function as a cam mechanism so that the block 51 might be termed a cam member and the surface 49 a cam surface.

What I claim is:

1. In a device of the class described a supporting bracket; a passage-bearing member fixedly mounted on said bracket; a work-piece contacting member adapted for contacting at one of its ends with a work-piece and slidably projected at its opposite end into said passage-bearing member, said end within said passage-bearing member having a cam surface; an engagement block slidably mounted within said passage-bearing member and engageable with said cam surface for preventing movement of said contacting member inwardly of said passage-bearing member and a spring for normally retaining said engagement block in clamping relation to said cam surface and a cylinder; a piston slidably mounted in said cylinder, a piston rod on said piston projecting into said passage-bearing member and engageable with one end of said contacting member; an extension on said piston rod slidably projecting through a portion of said contacting member and having a head engageable with said engagement block, the movement of said piston in one direction effecting an outward movement of said contacting member and thereafter, through said spring, movement of said engagement block into clamping relation with said cam surface, the movement of said piston in the opposite direction effecting a movement of said engagement block from clamping relation with said cam surface and thereafter, through said spring, movement of said contacting member inwardly of said bearing member.

2. In a device of the class described, a supporting bracket; a passage-bearing member having a passage formed therein and supported by said bracket; a work-piece contacting member; a carrying member for carrying said contacting member and slidably projected at one of its ends into said passage and provided within said passage with a cam surface; a thrust delivery member projecting into said passage for delivering a thrust to said carrying member for moving the same in one direction; a locking block slidably mounted in said passage and engageable with said cam surface for locking said carrying member against slidable movement in said passage in the opposite direction; and a spring positioned in said passage and movable in unison with said carrying member and engageable at one end with said locking block normally urging the same into engagement with said cam surface; and a member on said thrust delivery member engageable with said locking block for moving said locking block out of engagement with said cam surface upon movement of said thrust delivery member in the opposite direction and delivering a thrust on said carrying member in said opposite direction through said spring.

LYSLE L. HAZEN.

References Cited in the file of this patent

UNITED STATES PATENTS

| Number | Name | Date |
|---|---|---|
| 115,290 | Faught | May 30, 1871 |
| 1,401,131 | Blackburn | Dec. 27, 1921 |
| 1,490,405 | Stanton | Apr. 15, 1924 |
| 1,875,486 | Peaslee | Sept. 6, 1932 |
| 1,885,233 | Cole | Nov. 1, 1932 |
| 2,436,587 | Marshall | Feb. 24, 1948 |